Figure 1:
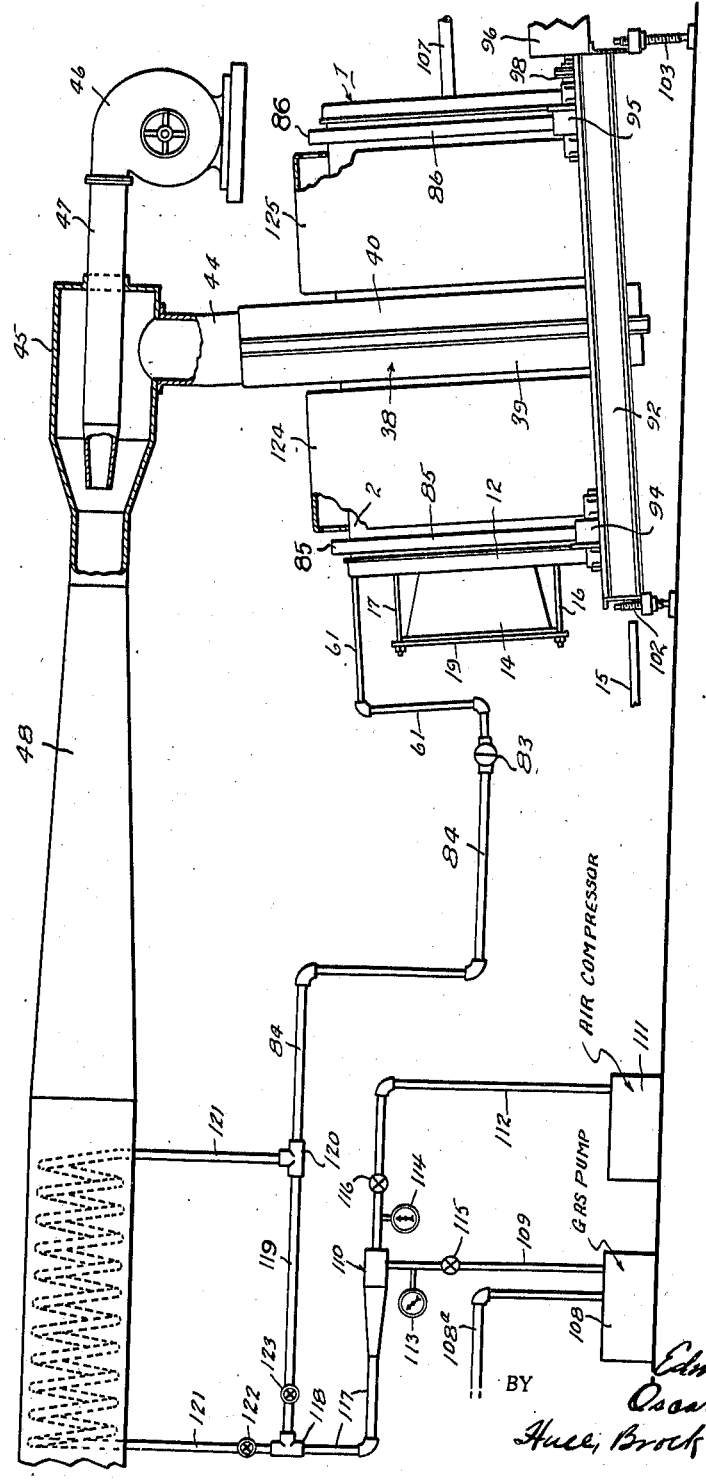

March 14, 1939. E. L. WIEGAND ET AL 2,150,533
METHOD OF PRODUCING COMBUSTION
Filed June 11, 1937   5 Sheets-Sheet 1

INVENTOR.
Edwin L. Wiegand
Oscar R. Olson
BY Hull, Brock West
ATTORNEY.

March 14, 1939.  E. L. WIEGAND ET AL  2,150,533
METHOD OF PRODUCING COMBUSTION
Filed June 11, 1937  5 Sheets-Sheet 4

March 14, 1939.  E. L. WIEGAND ET AL  2,150,533
METHOD OF PRODUCING COMBUSTION
Filed June 11, 1937  5 Sheets-Sheet 5

Patented Mar. 14, 1939

2,150,533

UNITED STATES PATENT OFFICE 2,150,533

METHOD OF PRODUCING COMBUSTION

Edwin L. Wiegand and Oscar R. Olson, Pittsburgh, Pa.; said Olson assignor to said Wiegand Application June 11, 1937, Serial No. 147,679

2 Claims. (Cl. 158—117.5)

This invention relates generally to high temperature furnaces and more particularly to furnaces which are generally known as muffle type furnaces in which the material being treated is maintained out of direct contact with the products of combustion. The specific furnace herein disclosed is a rotary furnace of the muffle type adapted to have the material to be treated fed therethrough continuously. The furnace consists generally of a central chamber or retort through which the material to be treated is fed and which is surrounded by a combustion chamber which is constructed of suitable refractory material such as sillimanite, aluminum silicate or zirconium refractory material. The retort is preferably formed of plumbago. The inner wall of the combustion chamber is lined with refractory material which in turn is covered with a heat insulating brick and the whole structure is enclosed within a metal shell or casing which is rotatably supported on rollers carried by a base member. Suitable means are provided for raising and lowering one end of the base member and with it the furnace which is carried thereby. Suitable driving means are provided which are adjustable for rotating the furnace at various speeds.

One object of the invention is to provide a method of producing high temperatures within a furnace which consists in delivering to the furnace a mixture of gaseous fuel and air at a manifold pressure in excess of 30 pounds per square inch and mixing with such fuel mixture an approximately equal volume of air and burning the mixture in the furnace and withdrawing the burned gases from the furnace at a predetermined rate so as to maintain the desired pressure condition within the furnace.

Still another object of the invention is to provide a new and improved method of burning fuel and heating a furnace of the character described so as to maintain a very high temperature and a maximum concentration of energy in a small space so that a large amount of material may be treated in a relatively small furnace.

A further object of the invention is to provide a method of heating a furnace which comprises burning gaseous fuel in the furnace under high pressure and controlling the rate of withdrawal of the products of combustion so as to maintain the desired pressure conditions in the furnace.

Figure 2:
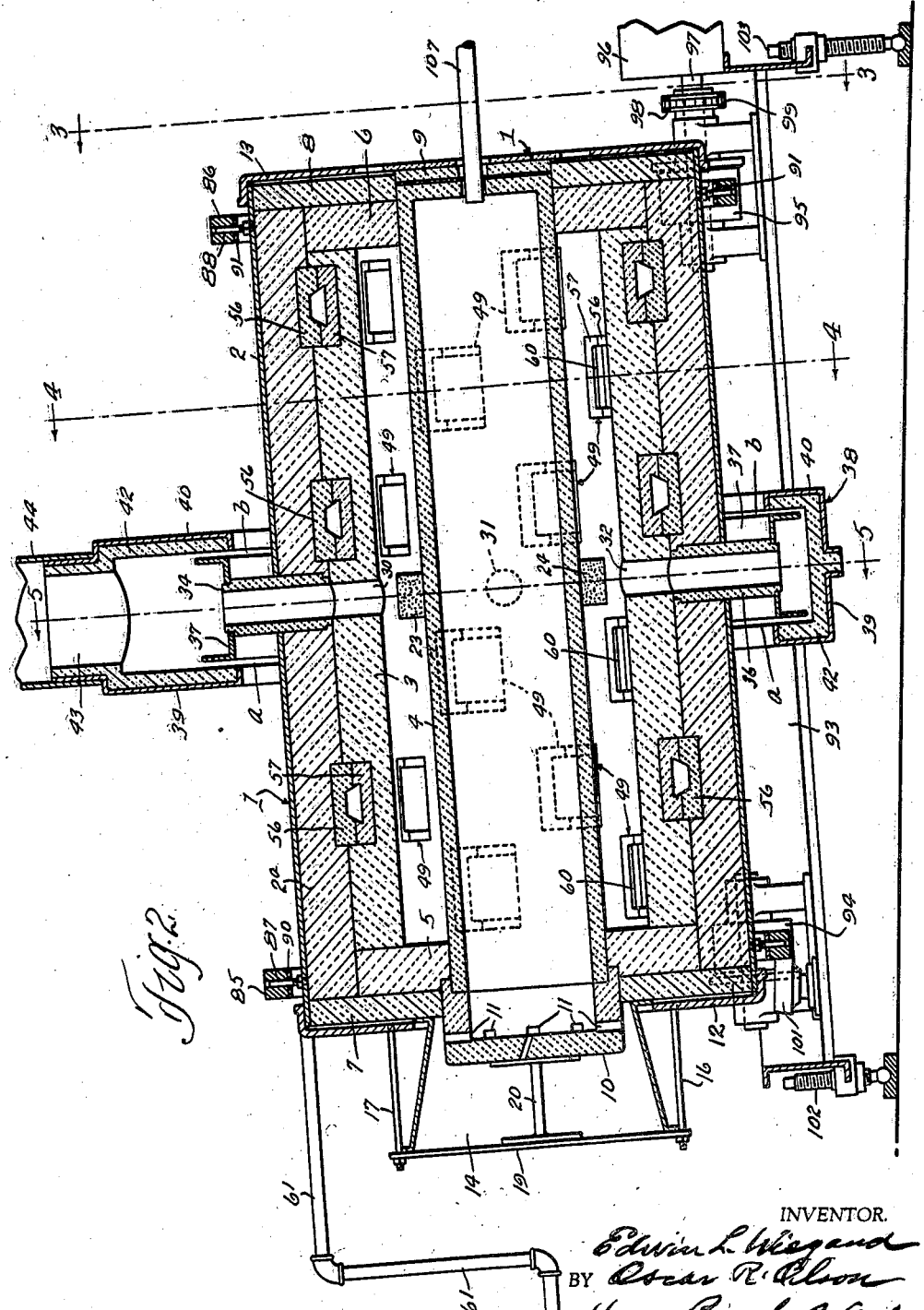
Figure 3:
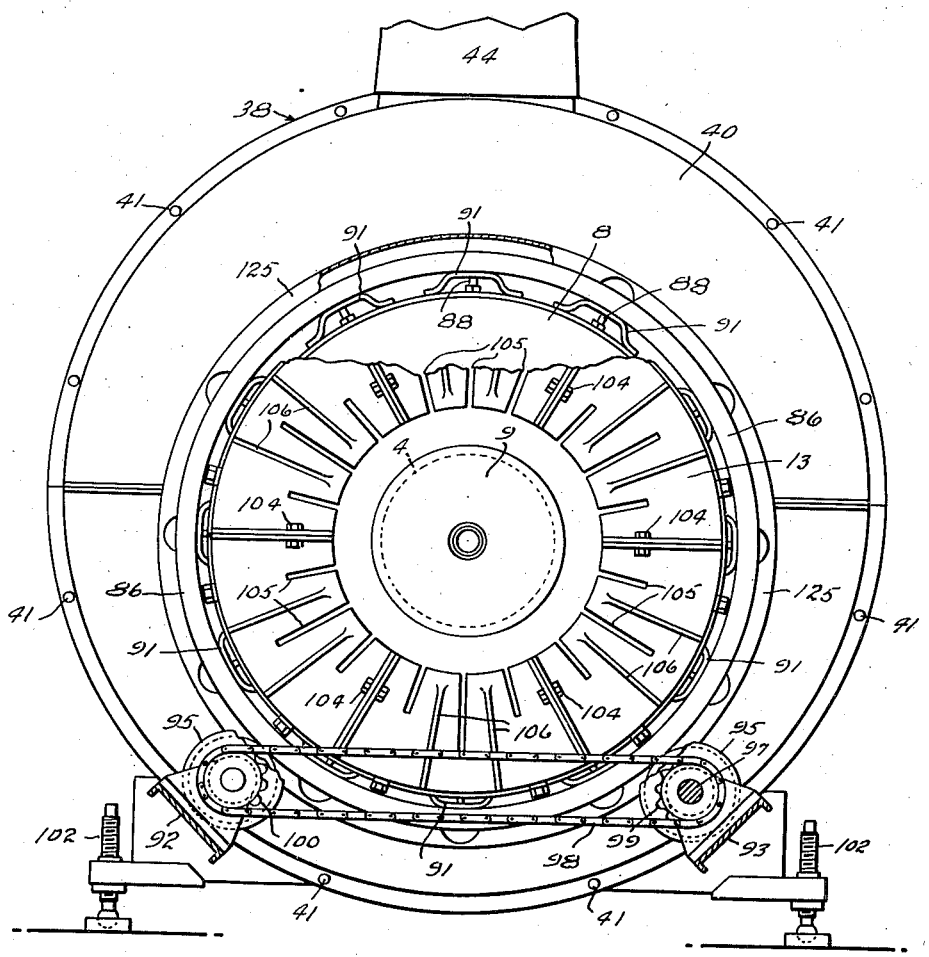
Figure 4:
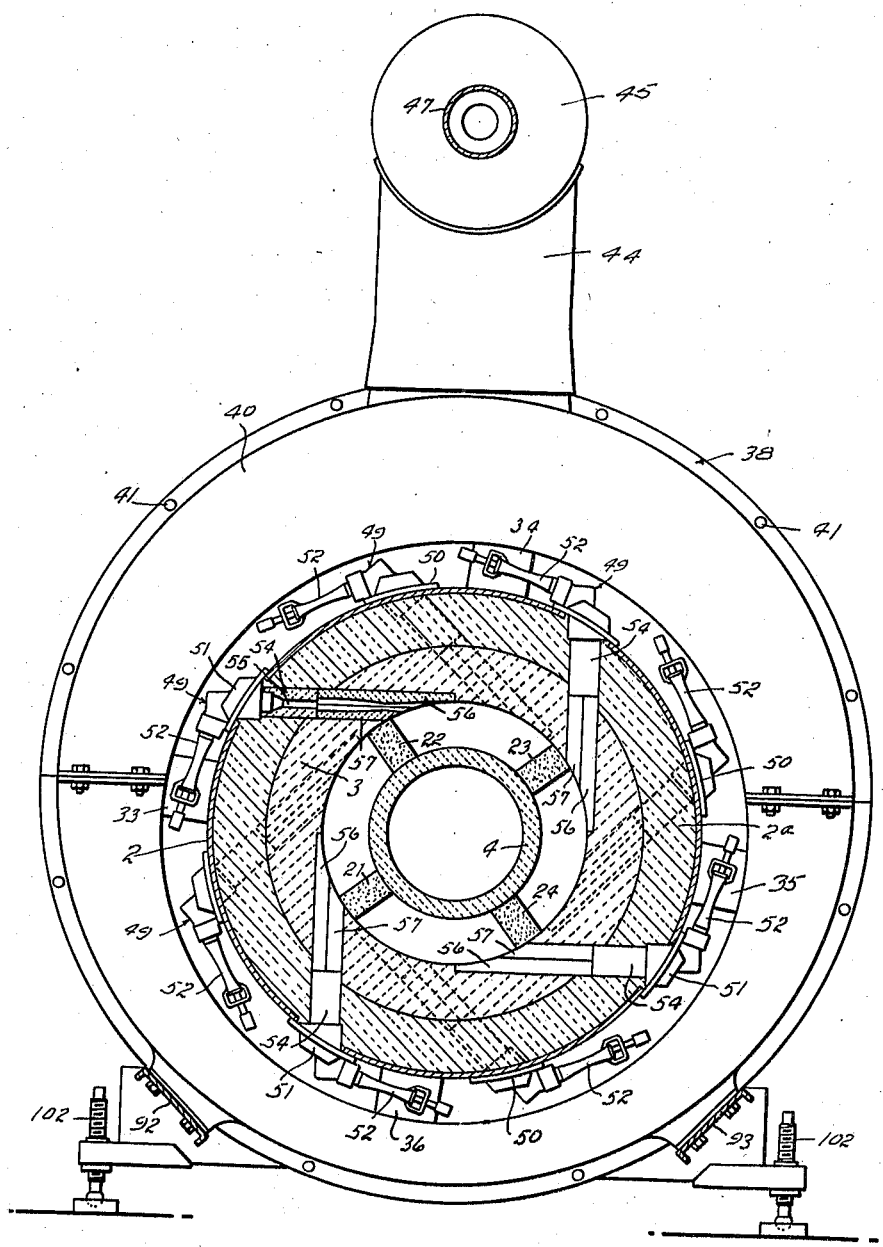
Figure 5:
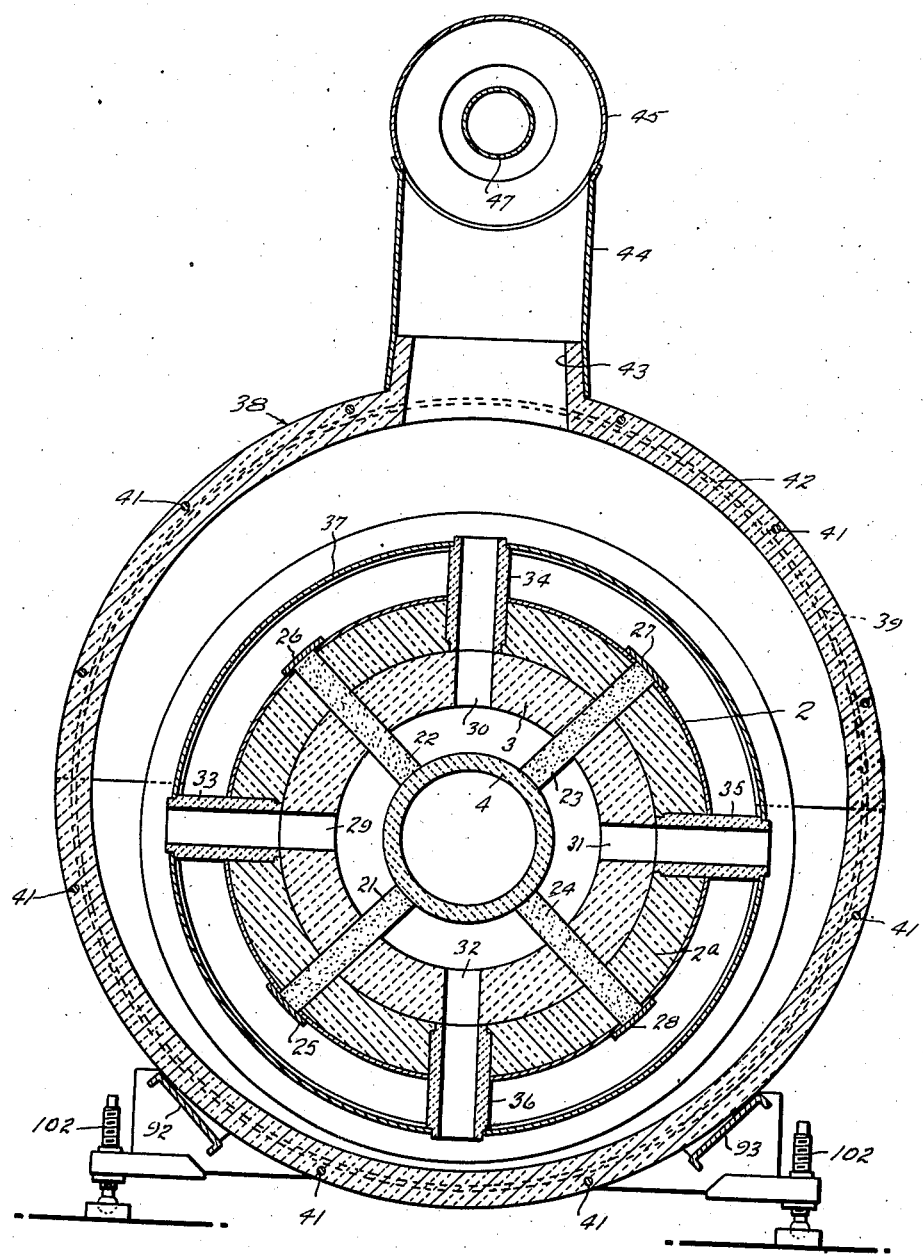

Further and more limited objects of the invention will appear as the description proceeds and by reference to the accompanying drawings in which Fig. 1 is a view in side elevation of the furnace and heating system and disclosing the means for pre-mixing the fuel and for exhausting the burned gases from the furnace; Fig. 2 is a vertical sectional view through the furnace; Fig. 3 is a vertical sectional view on the line 3—3 of Fig. 2; Fig. 4 is a vertical sectional view on the line 4—4 of Fig. 2; and Fig. 5 is a vertical sectional view on the line 5—5 of Fig. 2.

Referring now to the drawings, the reference character 1 designates generally the furnace which consists essentially of an outer metal shell or casing 2 which is preferably cylindrical in shape and which is lined with a layer of heat insulating material 2ª of considerable thickness such as insulating brick. The combustion chamber proper is preferably cylindrical in shape and fits within the layer of heat insulating brick and is formed of suitable refractory material having a steep temperature gradient such as sillimanite or aluminum silicate or zirconium refractory material. The wall of the combustion chamber is indicated by the reference character 3. Disposed within the combustion chamber, preferably in concentric relation therewith, is a cylindrical retort 4 which is preferably formed of plumbago and which is covered on both the inside and on the outside with a coating of highly refractory material such as zirconium oxide or thorium oxide or zirconium silicate about $\frac{1}{32}$" in thickness which serves as a protection against erosion, corrosion and abrasion. The ends of the combustion chamber are closed by a pair of cylindrical plates 5 and 6 which are formed of the same material as the walls of the combustion chamber and which have circular openings therein which receive the opposite ends of the retort 4. A pair of plates 7 and 8 which are formed of heat insulating material fit over the opposite ends of the furnace and also have openings therein into which the ends of the retort project. Fitting over the receiving end of the retort is a circular plate 9 which has an opening therein and which is formed of refractory material. Fitting over the delivery end of the retort is a block 10 of heating refractory material which has openings 11 therein through which the material may be discharged. Fitting over the opposite ends of the furnace are end plates 12 and 13 which are formed of metal and which are secured to the outer metal shell 2 by means of suitable bolts. These end plates are made up of a plurality of sections and are so positioned as to leave a slight air space between them and the end plates 7 and 8, respectively.

Disposed adjacent the end block 10 is a discharge funnel 14 into which the material from the retort is discharged and which delivers onto a conveyor 15. The funnel engages under the end plate 12 and is held in place by bolts 16 and 17 and a spider 19. Disposed between the end plate 10 and the spider 19 is a member 20 which serves to hold the end block 10 in place.

In order to provide proper support for the retort, there are provided four blocks of refractory material which are indicated by the reference characters 21, 22, 23 and 24 which are rectangular in section and which are arranged in radial slots provided in the wall of the furnace. The slots extend entirely through the wall of the furnace and are closed by metal plates 25, 26, 27 and 28. The inner ends of these supporting blocks are shaped to fit the curvature of the retort and bear thereagainst and support the retort at its central portion. The furnace is also provided with four radially disposed bores or openings 29, 30, 31 and 32 which extend through the outer wall thereof, that is, through the refractory material and also through the heat insulating material. Arranged in the outer ends of these bores are four tubular members 33, 34, 35 and 36 which are formed of refractory material and which are tubular in shape. These members are set in recesses provided in the heat insulating material and constitute continuations of the bores 29, 30, 31 and 32. Extending about the wall of the furnace at this point is an annular member 37 formed of metal and made up of a plurality of sections which are secured together in any suitable manner. The annular member 37 has circular openings therein which receive the outer ends of the tubular members 33, 34, 35 and 36, as shown most clearly in Figs. 2 and 5.

In order to withdraw the burned gases and products of combustion from the furnace, there is provided an exhaust manifold 38 which is made up of a pair of plates 39 and 40 which are shaped in section, as shown most clearly in Fig. 2, and secured together by means of bolts 41. The exhaust manifold is lined with heat insulating material 42. The exhaust manifold is somewhat oval in cross section, as shown in Fig. 5, and has an opening 43 at the upper end thereof from which leads a conduit 44 which connects with an expirator 45. From an inspection of Fig. 2, it will be seen that the exhaust manifold is slightly larger than the annular member 37 and surrounds the same leaving a slight space at each side thereof indicated by the reference characters a and b through which air is drawn to cool the exhaust manifold. The entire exhaust manifold is lined with heat insulated material so as to prevent it from reaching too high a temperature.

Disposed adjacent the expirator 45 is a variable speed motor operated air fan 46 which delivers air into the inspirator through a conduit 47 and which serves to provide an injector action which withdraws the burned gases and products of combustion from the furnace. These gases are delivered through a conduit 48 to the outside air through a flue or the like.

In order to heat the combustion chamber there are provided twenty-four gaseous fuel burners of the Bunsen type which are indicated by the reference character 49. Each of these burners consists of a burner head 50 which is formed of metal and which is rectangular in shape and provided with a plurality of cooling fins or ribs 51. Each of the burners also has connected therewith an air mixer 52 through which the fuel is delivered. Each burner is secured to the outer shell or casing by means of suitable bolts. Adjustable means are provided for regulating the supply of air to the air mixer. Bores or passageways are provided in the wall of the combustion chamber which lead into the combustion chamber and arranged in each of these bores is a rectangular member 54 which has a bore 55 therein. As the fuel is supplied to the burner under a manifold pressure of 90 to 95 pounds, it is necessary to provide burner tunnels which are of such size, capacity and design as to cause the flame to be maintained within a well defined area. These burner tunnels are illustrated in Figs. 2 and 4. Each burner tunnel consists of upper and lower blocks of suitable refractory material which are indicated by the reference characters 56 and 57. These blocks are secured in interlocking relation and are disposed within the passageway leading from each burner. Each burner tunnel has formed therein a combustion chamber of such size, shape and capacity as to create a zone in which the velocity of the fuel mixture is equal to or greater than the rate of flame propagation of the fuel delivered thereto. Each of these burner tunnels has an elongated delivery opening disposed so as to discharge tangentially with respect to the inner wall of the combustion chamber.

As the fuel is delivered through the air mixer for each burner it entrains therewith an approximately equal volume of air and due to the size of the bore 55, the fuel is delivered to the combustion zone at high velocity. Due to the shape and size of the burner tunnel, the flame is maintained within a definite area within the burner tunnel. It will be seen that the burner tunnel flares outwardly from the receiving end thereof and that immediately in advance of the delivery end there is provided a throat portion from which leads a somewhat flaring outlet.

Surrounding the furnace and disposed adjacent the opposite ends thereof are a pair of annular members called tires which are indicated by the reference characters 85 and 86. Each of the tires is somewhat larger than the furnace so as to leave a small space between the tires and the furnace wall or casing. Secured in the furnace wall and extending into openings provided in the tires are a plurality of studs 87 and 88. Disposed over the studs respectively are a plurality of spring clips 90 and 91 which are shown most clearly in Fig. 3 and serve to permit expansion of the furnace with respect to the tires.

The furnace is supported upon a base member which consists of a rectangular frame which includes longitudinally extending members 92 and 93. Carried by the longitudinally extending frame members 92 and 93 and disposed at opposite ends of the furnace are oppositely disposed pairs of rollers 94 and 95 which receive thereon the tires 85 and 86. One rear roller 95 is power operated through a suitable reduction gearing 96 and a shaft 97. The opposite roller 95 is driven through the medium of a chain 98 which engages sprockets 99 and 100. Disposed at the delivery end of the furnace and carried by the base thereof are a pair of thrust rollers one of which is shown at 101 on Fig. 2. These rollers bear against the tire 85 and serve to hold the furnace against movement toward the delivery end thereof. The frame or base is supported upon adjustable legs 102 and 103 which may be adjusted to vary the angle of inclination of the furnace which serves to vary the rate of delivery through the retort of the material being treated. The end plates for the furnace which are indicated by the reference characters 12 and 13 are made up of a plurality of sections and are bolted together by bolts 104. Each of these plates is provided with slots 105 and has ribs 106 thereon to allow for contraction and expansion of the plates. The material to be treated is delivered to the furnace through a spout 107.

In order to concentrate a great amount of energy and create a high temperature within the combustion chamber, it is necessary that the fuel be fed to the furnace at considerable pressure as the twenty-four burners are designed to burn about 1200 cubic feet of natural gas per hour, the gas containing 1000 B. t. u.'s per cubic foot. In order to obtain this result, it is necessary to pre-mix the fuel so as to obtain a fuel mixture containing one part gas to about five parts air and to admix with each volume of the mixture at the burner air mixer an equal volume of air which will give a fuel mixture at each burner containing one part gas and about eleven parts air.

The apparatus for pre-mixing the fuel consists of a gas pump 108 from which leads a pipe 109 which delivers gas into an inspirator 110 at a pressure of about 75 to 80 pounds per square inch. Natural gas is delivered to the gas pump through a fuel pipe 108$^a$. By means of an air compresser 111 air is pumped through a pipe 112 into the inspirator 110 at a pressure of about 100 pounds per square inch. The reference characters 113, 114 indicate gauges for determining the pressure of gas and air. Suitable control valves 115 and 116 are provided for regulating the delivery of gas and air. Leading from the inspirator 110 is a pipe 117 which connects with a T 118 from which leads a pipe 119 which connects with a T 120 to which is connected the fuel supply pipe 84. The fuel mixture delivered to the pipe 84 contains about one part gas to five parts air which is delivered to the burners at a pressure between 90 and 95 pounds per square inch where an equal volume of air is admixed therewith.

In order to provide means for preheating the fuel mixture when desired there is provided a pipe 121 which leads through the outlet from the exhausting mechanism and thence into the T 120. Disposed in the pipe 121 is a hand operated valve 122 and disposed in the pipe 119 is a hand operated valve 123 which may be operated to deliver the fuel through the outlet from the exhaust manifold when and if desired. Should it be desired to preheat the air which is delivered into the burner air mixers, the furnace is provided with a pair of shells 124 and 125 which are detachably secured over the furnace and over the burners therefor so that the air which is inspirated into the burner air mixers may be heated, if desired.

*Operation*

In the operation of the furnace, power is supplied to the shaft 97 to rotate the combustion chamber and with it the retort which is supported therein. Fuel of the proper mixture is delivered to the main manifold 61 through the fuel supply pipe 84. An approximately equal volume of air is admixed with the fuel at the air mixer for each burner. The fuel is delivered to each burner at a pressure of 80 to 100 pounds per square inch. The fuel mixture is ignited at the burners in any suitable manner. Due to the design, shape and surface area of the burner tunnels, combustion normally takes place in the combustion zone of the burner tunnels and in designing the burner tunnels it is necessary to take into consideration the rate of flame propagation of the particular mixture of fuel, premature kindling, the type of refractory used in the construction of the combustion chamber, and the velocity and pressure at which the gas is delivered to the burner tunnels in order to keep the flame from flashing or burning back too close to the burner and in order to maintain the flame and combustion within a well defined area in the burner tunnels. The adjustable legs on the furnace are adjusted so that the retort has the proper angle of inclination to maintain the proper charge of material in the retort at all times so that the material being treated will be delivered from the furnace at the desired temperature. However, this angle may be varied depending upon the nature and character of the material being treated. By varying the angle of inclination of the furnace or by varying the speed of rotation of the furnace or by varying both, the time of the heating cycle and the temperature of the material delivered from the furnace may be regulated and controlled. The material to be treated is fed to the furnace by any suitable feeding mechanism which should be adjustable to vary the rate at which the material is fed into the furnace. With which the material is fed into the furnace, it is possible to all of the burners in operation, it is possible to obtain a temperature in the combustion chamber of approximately 3000° F. without preheating the fuel. Under such conditions, the temperature within the retort will be between 2100° F. and 2500° F., depending upon the rate of delivery of the material through the retort.

With a furnace constructed and operated as herein described, it is possible to concentrate a very great amount of energy within a small combustion space and at the same time treat a very large amount of material per hour and maintain the maximum temperature desired. If the fuel is preheated, higher temperatures and efficiency can be attained with the same fuel pressure and velocity. The speed of the blower which exhausts the products of combustion from the furnace may be varied so as to maintain the desired pressure condition in the combustion chamber.

It will now be clear that the heating system and apparatus herein disclosed will accomplish the objects of the invention as hereinbefore stated. It is, of course, to be understood that the embodiment of the invention herein disclosed is to be considered merely as illustrative and not in a limiting sense as various changes and modifications may be made in the details of construction, arrangement and design of parts, without departing from the spirit of the invention. For example, in some cases, it may be necessary to provide a plurality of exhaust manifolds disposed intermediate the ends of the furnace which would draw equally from both sides so as to maintain substantially uniform conditions throughout the combustion chamber. In some cases it may also be desirable to provide automatic temperature control for the furnace in addition to the control of the rate of the work being done and this control may be arranged to respond to conditions within the retort or within the combustion chamber or within both. The furnace is suitable for heat treating uniform or non-uniform material of various qualities and kinds. The plug which closes one end of the retort may be removable to permit the mechanical removal of fritted material in case the material being treated is subject to fritting.

The invention is therefore limited only in accordance with the scope of the appended claims.

This application is a companion case to our copending application Serial No. 147,678, filed June 11, 1937.

Having thus described our invention, what we claim is:

1. The method of producing combustion which consists in premixing air and fuel gas, the air being delivered at a pressure of about one hundred pounds per square inch, and the gas being delivered at a pressure of about eighty pounds per square inch, delivering such fuel mixture to a burner at a pressure of about ninety pounds per square inch, entraining in said final mixture an approximately equal volume of air and burning the mixture.

2. The method of producing combustion which consists in premixing air and gaseous fuel both under a pressure materially in excess of atmospheric pressure and in proportion of about one part gas and about five parts air, the air being delivered at a higher pressure than the gas, delivering such mixture to a burner without materially decreasing the pressure, admixing with said mixture in advance of the burner an approximately equal volume of additional air, discharging the final mixture from the burner at high velocity and burning the same.

EDWIN L. WIEGAND.
OSCAR R. OLSON.